(12) United States Patent
Saruwatari et al.

(10) Patent No.: US 8,349,503 B2
(45) Date of Patent: Jan. 8, 2013

(54) NONAQUEOUS IONIC LIQUID AND LITHIUM ION ELECTROLYTE BATTERY

(75) Inventors: Hidesato Saruwatari, Kawasaki (JP); Takashi Kishi, Yokosuka (JP); Takashi Kuboki, Tokyo (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1031 days.

(21) Appl. No.: 11/337,513

(22) Filed: Jan. 24, 2006

(65) Prior Publication Data

US 2006/0204855 A1 Sep. 14, 2006

(30) Foreign Application Priority Data

Mar. 14, 2005 (JP) ................................. 2005-071446

(51) Int. Cl.
*H01M 6/16* (2006.01)

(52) U.S. Cl. ....................................... 429/339; 429/324

(58) Field of Classification Search .................. 429/324, 429/339
See application file for complete search history.

(56) References Cited

U.S. PATENT DOCUMENTS

| | | | |
|---|---|---|---|
| 6,824,927 B1 * | 11/2004 | Katsurao et al. | 429/316 |
| 2002/0055047 A1 * | 5/2002 | Satoh et al. | 429/337 |
| 2004/0002002 A1 * | 1/2004 | Mizuta et al. | 429/188 |
| 2004/0023116 A1 * | 2/2004 | Fujino et al. | 429/231.95 |
| 2004/0062990 A1 * | 4/2004 | Shimamura et al. | 429/218.1 |
| 2005/0147889 A1 * | 7/2005 | Ohzuku et al. | 429/231.1 |
| 2005/0164082 A1 | 7/2005 | Kishi et al. | |
| 2005/0287439 A1 * | 12/2005 | Shimamura et al. | 429/231.4 |
| 2006/0035137 A1 * | 2/2006 | Maruo et al. | 429/46 |
| 2006/0068282 A1 | 3/2006 | Kishi et al. | |
| 2006/0210873 A1 * | 9/2006 | Hollenkamp et al. | 429/200 |
| 2007/0042271 A1 * | 2/2007 | Nishida et al. | 429/306 |

FOREIGN PATENT DOCUMENTS

| | | | |
|---|---|---|---|
| CN | 1094852 A | | 11/1994 |
| CN | 1444303 A | | 9/2003 |
| CN | 1449069 A | | 10/2003 |
| CN | 1495946 A | | 5/2004 |
| JP | 11-086905 | | 3/1999 |
| JP | 2002-110225 | | 4/2002 |
| JP | 2002-373704 | | 12/2002 |
| JP | 2004-165131 | | 6/2004 |
| WO | WO 03079469 A1 | * | 9/2003 |
| WO | WO 2004082059 A1 | * | 9/2004 |
| WO | WO 2005003108 A1 | * | 1/2005 |

OTHER PUBLICATIONS

U.S. Appl. No. 11/042,132 corresponding to JP 2004-18624.
Office Action dated Feb. 15, 2008 in Application No. CN 200610051573.2 with English translation.
Kanto Kagaku MSDS: http://www3.kanto.co.jp/catalog/msds/E_14644.pdf.
High-density Li secondary battery, K.K. Techno System, (1998), pp. 65-66, p. 221, p. 223.
Battery Handbook $3^{rd}$ Ed., Maruzen Co. (2001), p. 274.
TIMCAL Corp. Technical Sheet: http://www.timcal.com/scopi/group/timcal/timcal.nsf/pagesref/SCMM-7FGF84/$File/TIMREX_KS6.pdf.

* cited by examiner

*Primary Examiner* — Zachary Best
(74) *Attorney, Agent, or Firm* — Nixon & Vanderhye P.C.

(57) ABSTRACT

A nonaqueous electrolyte battery, including a case, a positive electrode housed in the case, a negative electrode housed in the case, and a nonaqueous electrolyte containing an ionic liquid and lithium ions of which molar amount is no smaller than $1.8 \times 10^{-5}$ mol per mAh of the battery capacity.

17 Claims, 2 Drawing Sheets

NONAQUEOUS IONIC LIQUID AND LITHIUM ION ELECTROLYTE BATTERY

CROSS-REFERENCE TO RELATED APPLICATIONS

This application is based upon and claims the benefit of priority from prior Japanese Patent Application No. 2005-071446, filed Mar. 14, 2005, the entire contents of which are incorporated herein by reference.

BACKGROUND OF THE INVENTION

1. Field of the Invention

The present invention relates to a nonaqueous electrolyte battery.

2. Description of the Related Art

Nowadays, a lithium ion secondary battery is expected to be used in applications requiring large current characteristics, i.e., to be mounted on, for example, vehicles such as an electric vehicle (EV) and a hybrid electric vehicle (HEV) or to be used as a large power storage.

Where the lithium ion secondary battery is used in the field exemplified above, higher safety is required in the secondary battery. What should be noted in this connection is that a combustible organic solvent is used for preparing the nonaqueous electrolyte that is used nowadays in the lithium ion secondary battery. So that, it is difficult to improve the safety of such lithium ion secondary battery. Such being the situation, an ionic liquid, which is an ionic fused material that is in the form of a liquid at room temperature, has attracted attention as a noncombustible nonaqueous electrolyte, as disclosed in, for example, Jpn. Pat. Appln. KOKAI Publication No. 2004-165131.

However, the ionic liquid has in general an electrical conductivity lower than that of the organic solvent and, thus, is poor in the large current characteristics.

BRIEF SUMMARY OF THE INVENTION

An object of the present invention is to provide a nonaqueous electrolyte battery excellent in particular in large current characteristics.

According to an aspect of the present invention, there is provided a nonaqueous electrolyte battery, comprising:
 a case;
 a positive electrode housed in the case;
 a negative electrode housed in the case; and
 a nonaqueous electrolyte containing an ionic liquid and lithium ions of which molar amount is no smaller than $1.8 \times 10^{-5}$ mol per mAh of the battery capacity.

DETAILED DESCRIPTION OF THE INVENTION

One embodiment of the present invention is directed to a lithium ion secondary battery using an ionic liquid for preparing the nonaqueous electrolyte.

The term "battery capacity" used herein denotes an average discharge capacity. The term "average discharge capacity" is described in general in a catalog under the name of capacity, rated capacity, standard capacity or nominal capacity.

The ionic liquid represents a liquid material formed of a combination of organic cations and anions.

Figure 1:
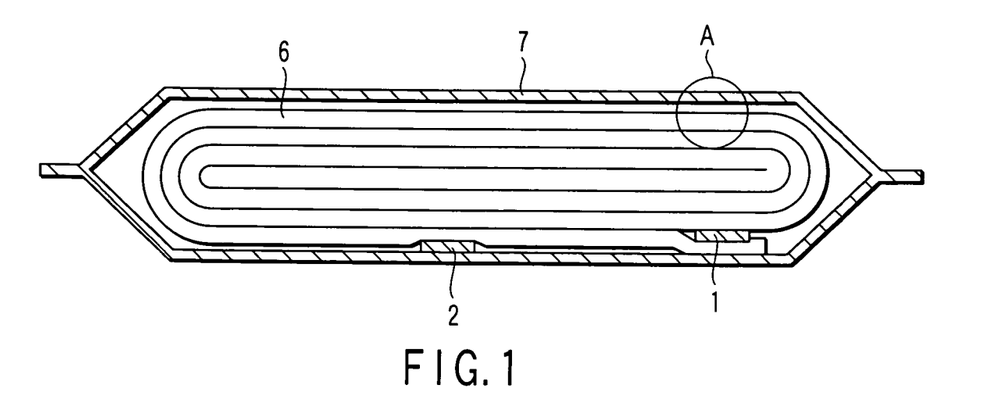
FIG. 1 is a cross-sectional view schematically exemplifying the construction of a nonaqueous electrolyte battery according to an embodiment of the present invention.
Figure 2:
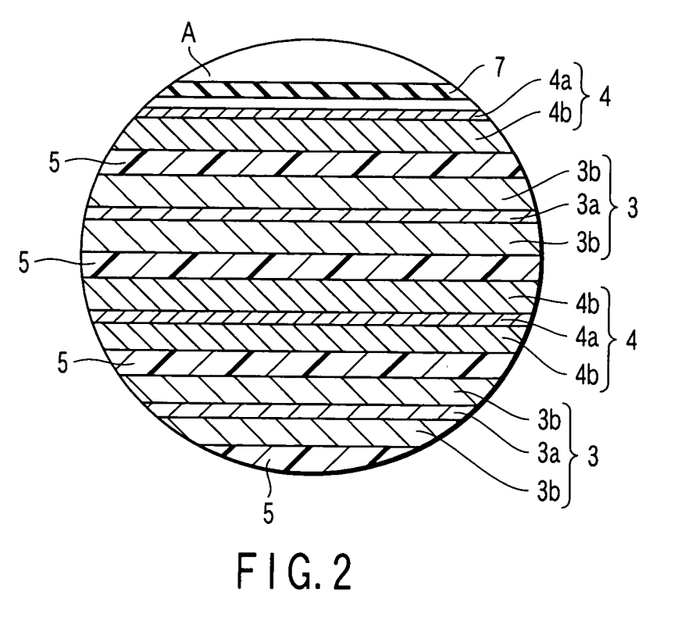
FIG. 2 is a cross-sectional view schematically showing in detail in a magnified fashion the construction in the circular region A shown in FIG. 1 of the nonaqueous electrolyte battery.

FIGS. 1 and 2 collectively show as an example the construction of the nonaqueous electrolyte battery according to one embodiment of the present invention. FIG. 1 is a cross-sectional view schematically showing the construction of a flat type nonaqueous electrolyte secondary battery according to one embodiment of the present invention, and FIG. 2 is a cross-sectional view schematically showing in detail the construction in the circular region A shown in FIG. 1 of the nonaqueous electrolyte secondary battery.

As shown in the drawings, a positive electrode terminal 1 is connected to a positive electrode 3, and a negative electrode terminal 2 is connected to a negative electrode 4. The positive electrode 3 and the negative electrode 4 are spirally wound with a separator 5 interposed between the positive electrode 3 and the negative electrode 4 so as to form a spirally wound electrode group 6 that is shaped flat. The wound electrode group 6 is housed in a case 7 filled with a nonaqueous electrolyte. Incidentally, the nonaqueous electrolyte (not shown) is prepared by dissolving an electrolyte in a nonaqueous solvent containing an ionic liquid.

As shown in FIG. 1, the spirally wound electrode group 6 that is shaped flat is housed in the case 7 filled with a nonaqueous electrolyte. The negative electrode terminal 2 is connected to the outside in the vicinity of the outer circumferential edge of the wound electrode group 6. Also, the negative electrode terminal 2 is electrically connected to the negative electrode current collector of the negative electrode 4. In contrast, the positive electrode terminal 1 is connected to the inside in the vicinity of the outer circumferential edge of the wound electrode group 6. Also, the positive electrode terminal 1 is electrically connected to the positive electrode current collector of the positive electrode 3. The wound electrode group 6 is formed of a laminate structure including the negative electrode 4, the separator 5, the positive electrode 3 and the separator 5, which are laminated one upon the other in the order mentioned as viewed from the outermost layer.

The construction of the would electrode group 6 will now be described in more detail. As shown in FIG. 2, the positive electrode 3 and the negative electrode 4 are arranged to face each other with the separator 5 interposed between the positive electrode 3 and the negative electrode 4 so as to form a laminate structure. The negative electrode 4 on the outermost side comprises a negative electrode current collector 4a and a negative electrode layer 4b, which are arranged to form a laminate structure in which the negative electrode current collector 4a is on the outside. Each of the other negative electrodes 4 comprises a negative electrode layer 4b, a negative electrode current collector 4a, and another negative electrode layer 4b, which are arranged to form a laminate structure. On the other hand, each of the positive electrodes 3 comprises a positive electrode layer 3b, a positive electrode current collector 3a and another positive electrode layer 3b, which are arranged to form a laminate structure.

The nonaqueous electrolyte, the positive electrode, the negative electrode, the separator and the case will now be described in detail.

1) Nonaqueous Electrolyte:

The nonaqueous electrolyte used in the embodiment of the present invention comprises an ionic liquid and lithium ions of which molar amount is no smaller than $1.8 \times 10^{-5}$ mol per mAh of the battery capacity.

According to the embodiment of the present invention, the nonaqueous electrolyte battery comprises the nonaqueous electrolyte containing no smaller than $1.8 \times 10^{-5}$ mol of lithium ions per mAh of the battery capacity so as to improve the large current characteristics of the nonaqueous electrolyte battery. It is considered reasonable to understand that, in the case of the ionic liquid, the migration of the lithium ions by the hopping is predominant so that it is possible to improve the large current characteristics of the nonaqueous electrolyte battery. Such being the situation, the hopping migration of the lithium ions is considered to be made smoother with increase in the absolute number of lithium ions within the nonaqueous electrolyte.

On the other hand, in the nonaqueous electrolyte battery using an organic solvent in preparing the nonaqueous electrolyte, the large current characteristics are not significantly affected even if the molar amount of the lithium ions within the nonaqueous electrolyte is controlled. It is considered reasonable to understand that the migration of the lithium ions by the diffusion is predominant in the case of the organic solvent and, thus, the large current characteristics are not significantly affected even if the molar amount of the lithium ions within the nonaqueous electrolyte is controlled.

It is desirable for the molar amount of the lithium ions to be no larger than $4.5 \times 10^{-5}$ mol per mAh of the battery capacity. If the molar amount of the lithium ions is no larger than $4.5 \times 10^{-5}$ mol per mAh of the battery capacity, it is possible to prevent the volume of the nonaqueous electrolyte relative to the total volume of the nonaqueous electrolyte battery from being made excessively large in view of the relationship with the lithium ion concentration that is described herein later. With the result that it is possible for the nonaqueous electrolyte battery to obtain high energy density. It is more desirable for the molar amount of the lithium ions to fall within no smaller than $2 \times 10^{-5}$ mol to no larger than $3.5 \times 10^{-5}$ mol per mAh of the battery capacity. Where the molar amount of the lithium ions falls within the range given above, it is possible for the nonaqueous electrolyte battery to obtain both high energy density and excellent large current characteristics.

It is desirable for the lithium ion concentration in the nonaqueous electrolyte to be no lower than 1 mol/L. If the lithium ion concentration is no lower than 1 mol/L, it is possible to moderate easily the lowering of the volume energy density derived from the increase in the volume of the nonaqueous electrolyte. Incidentally, the relationship among the molar amount of the lithium ions, the lithium ion concentration, and the volume of the nonaqueous electrolyte can be represented by the formula given below:

$$L/C = V$$

where L represents the molar amount [mol] of the lithium ions, C represents the lithium ion concentration [mol/L], and V represents the volume [L] of the nonaqueous electrolyte.

It is desirable for the lithium ion concentration in the nonaqueous electrolyte to be no higher than 3 mol/L. If the lithium ion concentration is no higher than 3 mol/L, the lowering of the electrical conductivity accompanying the increase in the viscosity of the nonaqueous electrolyte is unlikely to be prominent. It is more desirable for the lithium ion concentration in the nonaqueous electrolyte to fall within no lower than 1.5 mol/L to no higher than 3 mol/L.

It is desirable for the electrical conductivity of the nonaqueous electrolyte to be no lower than 0.41 mS/cm at 25° C. As apparent from the Examples described herein later, the effect derived from the molar amount of the lithium ions specified in the embodiment of the present invention, which was described previously, is produced particularly prominently in the case where the electrical conductivity of the nonaqueous electrolyte is no lower than 0.41 mS/cm. It is desirable for the electrical conductivity of the nonaqueous electrolyte to be no higher than 20 mS/cm at 25° C. If the electrical conductivity of the nonaqueous electrolyte is no higher than 20 mS/cm, the effect derived from the molar amount of the lithium ions specified in the embodiment of the present invention, which was described previously, is produced more prominently. It is more desirable for the electrical conductivity of the nonaqueous electrolyte to be no higher than 10 mS/cm at 25° C.

The ionic liquid used in the embodiment of the present invention represents a liquid material formed of a combination of organic cations and anions.

The organic cations used in the embodiment of the present invention include at least one cation selected from the group consisting of, for example, imidazolium ions such as dialkyl imidazolium cation and trialkyl imidazolium cation, tetraalkyl ammonium ion, alkyl pyridinium ion, dialkyl pyrrolidinium ion, and dialkyl piperidinium ion. Particularly, it is desirable to use imidazolium ion, dialkyl piperidinium ion and tetraalkyl ammonium ion because these organic cations are excellent in electrical conductivity. These organic cations are ranked in the order of imidazolium ion>>dialkyl piperidinium ion>tetraalkyl ammonium ion, if arranged in the order of the electrical conductivity. The difference in electrical conductivity between the adjacent organic cations given above is increased with increase in the number of signs of inequality ">" sandwiched between the adjacent cations.

Among the dialkyl imidazolium ions, it is particularly desirable to use 1-ethyl-3-methyl imidazolium ion (EMI$^+$). Among the trialkyl imidazolium ions, it is particularly desirable to use 1,2-dimethyl-3-propyl imidazolium ion (DMPI$^+$). Among the tetraalkyl ammonium ions, it is particularly desirable to use dimethyl ethyl methoxy ammonium ion (DMEMA$^+$). Further, it is desirable to use 1-butyl pyridinium ion (BP$^+$) as the alkyl pyridinium ion and to use methyl propyl pyrrolidinium ion (13P$^+$) as the dialkyl pyrrolidinium ion. Still further, it is desirable to use methyl propyl piperidinium ion (13PP$^+$) as the dialkyl piperidinium ion.

The anions used in the embodiment of the present invention as the counterions of the organic cations exemplified above include, for example, $PF_6^-$, $PF_3(C_2F_5)_3^-$, $PF_3(CF_3)_3^-$, $BF_4^-$, $BF_2(CF_3)_2^-$, $BF_3(CF_3)^-$, $[B(COOCOO)_2^-]$ ("BOB$^-$", in abbreviation), $CF_3SO_3^-$ ("Tf$^-$", in abbreviation), $C_4F_9SO_3^-$ ("Nf$^-$", in abbreviation), $[(CF_3SO_2)_2N]^-$ ("TFSI$^-$", in abbreviation), $[(C_2F_5SO_2)_2N]^-$ ("BETI$^-$", in abbreviation), and $[(CN)_2N]^-$ ("DCA$^-$", in abbreviation). Particularly, it is desirable to use $BF_4^-$ (tetrafluoro borate ion), TFSI$^-$ (bis trifluoromethane sulfonyl amide ion) and BETI$^-$ (bis pentafluoroethane sulfonyl amide ion) because these anions are excellent in electrical conductivity. These anions are ranked in the order of $BF_4^-$>TFSI$^-$>BETI$^-$, if arranged in the order of the electrical conductivity.

The ionic liquid having the organic cations and anions described above include, for example, organic salts such as dialkyl imidazolium tetrafluoroborate (DI.BF$_4$), dialkyl imidazolium tris trifluoromethane sulfonyl methide {DI.C(CF$_3$SO$_2$)$_3$}, Dialkyl imidazolium hexafluorophosphate (DI.PF$_6$), and trialkyl imidazolium tris trifluoromethane sulfonyl methide {TI.C(CF$_3$SO$_2$)$_3$}.

Particularly, it is desirable to use (DI.BF$_4$), {DI.C(CF$_3$SO$_2$)$_3$} and {TI.C(CF$_3$SO$_2$)$_3$} because these organic salts are excellent in ionic conductivity, chemical stability and electrochemical stability. It is practically excellent to use 1-ethyl-3-methyl imidazolium tetrafluoroborate (EMI.BF$_4$), 1-ethyl-3-methyl imidazolium tris trifluoromethane sulfonyl methide {EMI.C(CF$_3$SO$_2$)$_3$}, and 1,2-dimethyl-3-propyl imidazolium tris trifluoromethane sulfonyl methide {DMPI.C(CF$_3$SO$_2$)$_3$}.

Also, where the secondary battery is assumed to be used under a relatively high temperature environment of, e.g., 60° C., it is desirable to use 1-methyl-3-methyl imidazolium bis fluoroalkyl sulfonyl amide {EMI.C(C$_2$F$_5$SO$_2$)$_3$} and 1,2-dimethyl-3-propyl imidazolium bis fluoroalkyl sulfonyl amide {DMPI.C(C$_2$F$_5$SO$_2$)$_3$} because these organic salts exhibit high chemical stability at a relatively high temperature.

Incidentally, the ionic liquid containing the cations exemplified above can be used singly or in the form of a mixture of a plurality of different kinds of the ionic liquid containing the cations exemplified above.

The lithium salt containing a lithium ion as the cation is used as the electrolyte.

The anions forming the counterion of the lithium ion includes, for example, chloride anions (Cl$^-$, ClO$_4^-$), bromide anion (Br$^-$), iodide anion (I$^-$), fluoride anions [BF$_4^-$, PF$_6^-$, CF$_3$SO$_3^-$, N(CF$_3$CF$_2$SO$_2$)$_2^-$, tris trifluoromethane sulfonyl methide anion {C(CF$_3$SO$_2$)$_3^-$}], bis oxalate borate anion (BOB$^-$) and dicyano amine anion (DCA$^-$). The electrolyte used in the embodiment of the present invention includes, for example, the salt containing a single or a plurality of anions selected from the group given above, though the electrolyte used in the embodiment of the present invention is not limited to the salt noted above.

It is possible to add an organic solvent to the nonaqueous electrolyte. The viscosity of the nonaqueous electrolyte is expected to be lowered by the addition of the organic solvent. Also, the electrical conductivity of the nonaqueous electrolyte is expected to be increased by the addition of the organic solvent.

The organic solvent, which can be used in the embodiment of the present invention, is not particularly limited and includes, for example, propylene carbonate, ethylene carbonate, 1,2-dimethoxy ethane, γ-butyrolactone, tetrahydrofuran, 2-methyl tetrahydrofuran, 1,3-dioxolane, sulfolane, acetonitrile, diethyl carbonate, dimethyl carbonate, methyl ethyl carbonate, dipropyl carbonate, and phosphoric esters such as trimethyl phosphate and triethyl phosphate. Incidentally, these organic solvents can be used singly or in the form of a mixture a plurality of these organic solvents.

It is desirable to add the organic solvent in an amount of no less than 0% to no more than 50% by weight based on the total weight of the nonaqueous electrolyte. If the addition amount of the organic solvent exceeds 50% by weight of the total amount of the nonaqueous electrolyte, it is difficult to obtain the effect of improving the safety of the nonaqueous electrolyte battery produced by the use of the ionic liquid. It is more desirable for the addition amount of the organic solvent to fall within no less than 0.001% to no more than 20% by weight of the total amount of the nonaqueous electrolyte.

It is possible to add vinylene carbonate (VC), vinylene acetate (VA) and catechol carbonate (CC) to the nonaqueous electrolyte. In the case of using these additives, it is possible to form a film, which is electrochemically stable and has a low electric resistivity, on the surface of the electrode so as to improve the large current characteristics of the nonaqueous electrolyte battery. It is desirable for the addition amount of these additives to fall within no less than 0.01% to no more than 5% by weight. If the addition amount is less than 0.01% by weight, it is difficult to obtain the effect produced by the addition of the particular additive. On the other hand, if the addition amount exceeds 5% by weight, the film formed by the addition of the particular additive becomes excessively thick, with the result that the large current characteristics tend to be degraded by contraries. It is more desirable for the addition amount of the particular additive noted above to fall within no less than 0.1% to no more than 3% by weight. Incidentally, it is possible to use a single additive or a mixture of a plurality of additives noted above.

2) Positive Electrode

The positive electrode can be prepared by dispersing a positive electrode active material and an electronic conductor in a suitable solvent so as to obtain a suspension, followed by coating a current collector such as an aluminum foil with the suspension and subsequently drying and pressing the coated suspension so as to form a positive electrode layer on the current collector.

The positive electrode active material, which is capable of intercalation-deintercalation of lithium ions, includes, for example, various oxides and sulfides. To be more specific, the positive electrode active material used in the embodiment of the present invention includes, for example, manganese dioxide (MnO$_2$), iron oxide, copper oxide, nickel oxide, a lithium-manganese composite oxide (e.g., Li$_x$Mn$_2$O$_4$ or Li$_x$MnO$_2$), a lithium-nickel composite oxide (e.g., Li$_x$NiO$_2$), a lithium-cobalt composite oxide (Li$_x$CoO$_2$), a lithium-nickel-cobalt composite oxide (e.g., LiNi$_{1-y}$Co$_y$O$_2$), a lithium-manganese-cobalt composite oxide (e.g., LiMn$_y$Co$_{1-y}$O$_2$), a spinel type lithium-manganese-nickel composite oxide (Li$_x$Mn$_{2-y}$Ni$_y$O$_4$), lithium-phosphorus oxides having an olivine structure (e.g., Li$_x$FePO$_4$, Li$_x$Fe$_{1-y}$Mn$_y$PO$_4$, and Li$_x$CoPO$_4$), iron sulfate {Fe$_2$(SO$_4$)$_3$}, and vanadium oxide (e.g., V$_2$O$_5$). It is also possible to use as the positive electrode active material, an organic material or an inorganic material such as a conductive polymer, e.g., polyaniline or polypyrrole, a disulfide based polymer, sulfur (S) or a fluorocarbon.

It is more desirable for the positive electrode active material to include a lithium-manganese composite oxide (Li$_x$Mn$_2$O$_4$), a lithium-nickel composite oxide (Li$_x$NiO$_2$), a lithium-cobalt composite oxide (Li$_x$CoO$_2$), a lithium-nickel-cobalt composite oxide (Li$_x$Ni$_{1-y}$Co$_y$O$_2$), a spinel type lithium-manganese-nickel composite oxide (Li$_x$Mn$_{2-y}$Ni$_y$O$_4$), a lithium-manganese-cobalt composite oxide (Li$_x$Mn$_y$Co$_{1-y}$O$_2$) and lithium iron phosphate (Li$_x$FePO$_4$). In the case of using the positive electrode active material noted above, it is possible to obtain a high battery voltage. Incidentally, it is desirable for the molar ratios x and y in the chemical formulas given above to fall within no smaller than 0 to no larger than 1.

The electronic conductor used in the positive electrode includes, for example, carbon black and graphite. Particularly, it is desirable to use carbon black as the electronic conductor. In the case of using carbon black as the electronic conductor in the positive electrode, the amount of the nonaqueous electrolyte that can be held by the positive electrode can be increased so as to make it possible to obtain a further improvement in the large current characteristics. Among the carbon blacks, it is desirable to use acetylene black, ketjen black and furnace black as the electronic conductor.

It is more desirable for the carbon black to exhibit the DBP Oil Absorption value falling within no smaller than 200 mL/100 g to no larger than 2,000 mL/100 g. In the case of using the electronic conductor having a DBP Oil Absorption value no smaller than 200 mL/100 g, it is possible to increase the amount of the nonaqueous electrolyte that can be held by the positive electrode so as to make it possible to increase the amount of the nonaqueous electrolyte within the positive electrode without the volumetric loss. On the other hand, where the DBP Oil Absorption value is no larger than 2,000 mL/100 g, it is possible to suppress the lowering of the charge-discharge cycle characteristics of the secondary battery that is caused by the increased reactivity between the positive electrode and the nonaqueous electrolyte, the increased reactivity noted above accompanying the increase in the specific surface area of the electronic conductor. It is more desirable for the DBP Oil Absorption value to fall within no smaller than 200 mL/100 g to no larger than 1,200 mL/100 g.

The DBP Oil Absorption value can be measured by the method specified in Japanese Industrial Standards (JIS) K 6217-4 or the method specified by the corresponding standards.

The positive electrode also contains a binder selected from the group consisting of, for example, polytetrafluoroethylene (PTFE), polyvinylidene fluoride (PVdF), a fluorinated rubber and styrene-butadiene rubber.

Concerning the mixing ratio of the positive electrode active material, the electronic conductor and the binder, it is desirable for the positive electrode active material to be contained in an amount of no less than 80% to no more than 95% by weight, for the electronic conductor to be contained in an amount of no less than 3% to no more than 20% by weight and for the binder to be contained in an amount of no less than 2% to no more than 7% by weight.

3) Negative Electrode

The negative electrode can be prepared by suspending a powdery negative electrode active material and a binder in a suitable solvent so as to obtain a suspension, followed by coating a metal current collector such as a copper foil or an aluminum foil with the suspension and subsequently drying and pressing the coated suspension so as to form a negative electrode layer on the negative electrode current collector.

The negative electrode active material, which is capable of intecalation-deintercalation of lithium ions, includes, for example, a lithium metal, a lithium alloy, a carbonaceous material or a metal compound.

The lithium alloy used as the negative electrode active material includes, for example, a lithium-aluminum alloy, a lithium-zinc alloy, a lithium-magnesium alloy, a lithium-silicon alloy, and a lithium-lead alloy. Incidentally, where a lithium alloy foil is used as the negative electrode active material, the alloy foil can be used as it is as a band-like electrode.

The carbonaceous material used as the negative electrode active material includes, for example, a natural graphite, a synthetic graphite, coke, a vapor-grown carbon fiber, a mesophase pitch based carbon fiber, a spherical carbon and a resin-baked carbon. It is more desirable for the carbonaceous material to include the vapor-grown carbon fiber, the mesophase pitch based carbon fiber and the spherical carbon. It is desirable for the carbonaceous material to have no larger than 0.340 nm of a interplanar spacing d002 of the (002) plane as determined by X-ray diffraction analysis.

The metal compound used as the negative electrode active material includes, for example, a metal oxide, a metal sulfide, and a metal nitride. The metal oxide used as the negative electrode active material includes, for example, lithium titanate ($Li_{4+x}Ti_5O_{12}$), tungsten oxide ($WO_3$), amorphous tin oxide, tin-silicon oxide ($SnSiO_3$), and silicon oxide (SiO). The metal sulfide used as the negative electrode active material includes, for example, lithium sulfide ($Li_2S$), molybdenum sulfide ($MoS_2$), and iron sulfide (FeS, $FeS_2$, $Li_xFeS_2$). The metal nitride used as the negative electrode active material includes, for example, lithium-cobalt nitride ($Li_xCo_yN$, 0<x<4, 0<y<0.5).

Particularly, it is desirable to use lithium titanate as the negative electrode active material. In the case of using lithium titanate as the negative electrode active material, it is desirable for the average particle diameter d50 of the lithium titanate particles, i.e., the average particle diameter in terms of the accumulation for 50% in measuring the particle size distribution of the particles (i.e., distribution of the particle size of the powdery particles), to fall within no smaller than 0.1 µm to no larger than 1.5 µm. If the average particle diameter d50 is no smaller than 0.1 µm, it is possible to prevent the charge-discharge cycle characteristics of the nonaqueous electrolyte battery from being made poor, which caused by the increase in the reactivity between the negative electrode and the nonaqueous electrolyte accompanying with the excessively large contact area between the two. On the other hand, if the average particle diameter d50 of the lithium titanate particle is no larger than 1.5 µm, an improvement in the large current characteristics of the nonaqueous electrolyte battery can be expected because the contact area between the lithium titanate particles and the nonaqueous electrolyte is increased. It is more desirable for the average particle diameter d50 of the lithium titanate particle to fall within no smaller than 0.4 µm to no larger than 1.2 µm.

It is possible for the negative electrode to contain an electronic conductor. The electronic conductor similar to that described previously in conjunction with the positive electrode can also be used in the negative electrode.

It is desirable for the negative electrode to contain carbon black. Where the negative electrode contains carbon black, the amount of the nonaqueous electrolyte that can be held by the negative electrode can be increased so as to make it possible to obtain more excellent large current discharge characteristics.

The binder used in the negative electrode includes, for example, polytetrafluoroethylene (PTFE), polyvinylidene fluoride (PVdF), a fluorinated rubber and styrene-butadiene rubber.

Concerning the mixing ratio of the negative electrode active material, the electronic conductor and the binder, it is desirable for the negative electrode active material to be contained in an amount of no less than 80% to no more than 95% by weight, for the electronic conductor to be contained in an amount of no less than 3% to no more than 20% by weight, and for the binder to be contained in an amount of no less than 2% to no more than 7% by weight.

4) Separator

An insulating thin film excellent in ion permeability and having a high mechanical strength can be used as the separator.

It is desirable for the separator to have a porosity falling within no smaller than 50% to no larger than 98%.

It is advantageous to use a separator having a porosity no smaller than 50% because the amount of the nonaqueous electrolyte that can be held by the electrode can be increased and, thus, it is possible to increase the amount of the nonaqueous electrolyte within the electrode without the volumetric loss of the nonaqueous electrolyte battery. On the other hand, where the porosity of the separator is no larger than 98%, the possibility of the short-circuiting can be markedly suppressed. It is more desirable for the porosity of the separator to fall within no smaller than 80% to no larger than 97%.

Incidentally, it is acceptable for the porosity of the separator to be locally ununiform as far as porosity falls within the preferred range given above. It is more desirable for the ununiformity of the porosity to be no larger than about 2% in view of the uniformity of the current distribution.

In view of the resistance to the nonaqueous electrolyte, it is desirable for the separator to be formed of, for example, polyolefins such as polypropylene and polyethylene, polyesters such as polyethylene terephthalate and polyvinylene terephthalate, and other materials such as polyimide, polyamide, glass fiber, polyvinylidene fluoride, polytetrafluoroethylene or cellulose.

It is possible for the separator to be in the form of a sheet, a finely porous membrane or an unwoven fabric.

5) Case

The case can be formed of a metal container or can be formed by using a laminate film.

The metal container used as the case includes, for example, metal cans formed of, for example, aluminum, an aluminum alloy, iron or a stainless steel. It is possible for the metal can used as the case to be prismatic or cylindrical.

The laminate film used for forming the case is a multi-layered film comprising a metal foil and a resin film covering the metal foil. It is possible to use polymers such as polypropylene (PP), polyethylene (PE), Nylon, and polyethylene terephthalate (PET) for forming the resin film covering the metal foil. It is more desirable for the case to be a metal container formed of a metal sheet having a thickness no larger than 0.2 mm or for the case to be formed of a laminate film having a thickness no larger than 0.2 mm.

Below are Examples of the present invention. Needless to say, the present invention is not limited to the following Examples as far as the subject matter of the present invention is not exceeded.

EXAMPLE 1

<Preparation of Positive Electrode>

A slurry was prepared by mixing 91 parts by weight of a lithium-cobalt composite oxide ($LiCoO_2$) powder used as a positive electrode active material, 2.5 parts by weight of acetylene black and 2.5 parts by weight of graphite used as electronic conductors, and 3 parts by weight of polyvinylidene fluoride (PVdF) used as a binder in a N-methylpyrrolidone (NMP) solution. The acetylene black used as the electronic conductor was available under the name of typed number FX35, which was manufactured by Electrochemical Industry, Inc. A current collector formed of an aluminum foil having a thickness of 15 µm was coated with the slurry thus obtained, followed by drying and, then, pressing the coated slurry so that a positive electrode having an electrode density of 3.0 g/cm³ was manufactured.

<Preparation of Negative Electrode>

A slurry was prepared by mixing 85 parts by weight of a lithium-titanium oxide ($Li_4Ti_5O_{12}$) powder used as a negative electrode active material and having a particle diameter of 0.9 µm, 5 parts by weight of graphite and 3 parts by weight of ketjen black used as electronic conductors, and 7 parts by weight of PVdF used as a binder in a N-methylpyrrolidone (NMP) solution. Then, a current collector formed of an aluminum foil having a thickness of 15 µm was coated with the slurry thus obtained, followed by drying and, then, pressing the coated slurry so that a negative electrode having an electrode density of 2.0 g/cm³ was manufactured.

<Preparation of Nonaqueous Electrolyte Battery>

A positive electrode was covered in tight contact with a separator formed of polyester (porosity of 90%). Then, a negative electrode was disposed in a manner to face the positive electrode so as to form a laminate structure, followed by spirally winding the laminate structure so as to form a coil. Further, the coil was pressed so as to flatten the coil. The flat coil thus prepared was inserted into a case formed of a laminate film including an aluminum foil and having a thickness of 0.1 mm.

On the other hand, a nonaqueous electrolyte having an electrical conductivity of 0.86 mS/cm at 25° C. was prepared by adding 1.0 M of $LiBF_4$ used as an electrolyte to 1-ethyl-3-methyl imidazolium tetrafluoro borate ($EMI.BF_4$). Further, the nonaqueous electrolyte was filled into the case such that the molar amount of the lithium ions was $3.5 \times 10^{-5}$ mol relative to 1.0 mAh of the battery capacity so that a thin nonaqueous electrolyte battery having a rated capacity of 450 mAh was obtained, which was constructed as shown in FIG. 1.

EXAMPLES 2 TO 6

A nonaqueous electrolyte battery was manufactured as in Example 1, except that the lithium ion concentration ($Li^+$ concentration) in the nonaqueous electrolyte was set as shown in Table 1.

EXAMPLE 7

A nonaqueous electrolyte battery was manufactured as in Example 2, except that the nonaqueous electrolyte used was prepared by adding 1.5 M of LiTFSI to 1-ethyl-3-methyl imidazolium tris trifluoromethane sulfonyl methide {EMI.C$(CF_3SO_2)_3$ (EMI.TFSI)}.

EXAMPLES 8 AND 9

A nonaqueous electrolyte battery was manufactured as in Example 2, except that the nonaqueous electrolyte was filled into the case such that the molar amount of the lithium ions ($Li^+$ molar amount) relative to 1.0 mAh of the battery capacity was controlled as shown in Table 1.

EXAMPLES 10 TO 13

A nonaqueous electrolyte battery was manufactured as in Example 2, except that the separator had a porosity as shown in Table 1.

EXAMPLE 14

A slurry was prepared by mixing 85 parts by weight of a mesophase carbon pitch fiber (MCF) powder used as a negative electrode active material, 5 parts by weight of graphite and 3 parts by weight of ketjen black used as electronic conductors, and 7 parts by weight of PVdF used as a binder in an N-methylpyrrolidone (NMP) solution. Then, a current collector formed of a copper foil having a thickness of 15 µm was coated with the slurry thus prepared, followed by drying and, then, pressing the coated slurry so that a negative electrode having an electrode density of 1.2 g/cm³ was manufactured.

On the other hand, a nonaqueous electrolyte was prepared by adding 1.5 M of LiTFSI to methyl propyl piperidinium tris trifluoromethane sulfonyl methide (13PP.TFSI).

Further, a nonaqueous electrolyte battery was manufactured as in Example 2, except that the negative electrode noted above and the nonaqueous electrolyte noted above were used for manufacturing the nonaqueous electrolyte battery.

EXAMPLE 15

A nonaqueous electrolyte battery was manufactured as in Example 14, except that used was the nonaqueous electrolyte prepared by adding 1.5 M of LiTFSI to dimethyl ethyl butyl ammonium tris trifluoromethane sulfonyl methide (1124N.TFSI)

EXAMPLE 16

A nonaqueous electrolyte battery was manufactured as in Example 2, except that used was the nonaqueous electrolyte prepared by adding 1.0 M of LiBETI to 1-ethyl-3-methyl imidazolium bis fluoroalkyl sulfonyl amide (EMI.BETI)

EXAMPLE 17

A nonaqueous electrolyte battery was manufactured as in Example 14, except that used was the nonaqueous electrolyte prepared by adding 1.5 M of LiTFSI to methyl propyl pyrrolidinium tris trifluoromethane sulfonyl methide (13P.TFSI)

COMPARATIVE EXAMPLE 1

A nonaqueous electrolyte battery was manufactured as in Example 2, except that the nonaqueous electrolyte was filled into the case by controlling the molar amount of the lithium ions relative to 1.0 mAh of the battery capacity at $1.2 \times 10^{-5}$ mol.

COMPARATIVE EXAMPLE 2

A nonaqueous electrolyte battery was manufactured as in Comparative Example 1, except that the lithium ion concentration within the nonaqueous electrolyte was set at 2.5 M.

COMPARATIVE EXAMPLE 3

A nonaqueous electrolyte battery was manufactured as in Comparative Example 1, except that used was a nonaqueous electrolyte prepared by adding 1.5 M of LiTFSI to 1-ethyl-3-methyl imidazolium tris trifluoromethane sulfonyl methide $\{EMI.C(CF_3SO_2)_3 \text{ (EMI.TFSI)}\}$.

COMPARATIVE EXAMPLE 4

A nonaqueous electrolyte battery was manufactured as in Example 14, except that the nonaqueous electrolyte was filled into the case by controlling the molar amount of the lithium ions relative to 1.0 mAh of the battery capacity at $1.2 \times 10^{-5}$ mol.

COMPARATIVE EXAMPLE 5

A nonaqueous electrolyte battery was manufactured as in Example 15, except that the nonaqueous electrolyte was filled into the case by controlling the molar amount of the lithium ions relative to 1.0 mAh of the battery capacity at $1.2 \times 10^{-5}$ mol.

COMPARATIVE EXAMPLE 6

A nonaqueous electrolyte battery was manufactured as in Example 16, except that the nonaqueous electrolyte was filled into the case by controlling the molar amount of the lithium ions relative to 1.0 mAh of the battery capacity at $1.2 \times 10^{-5}$ mol.

COMPARATIVE EXAMPLE 7

A nonaqueous electrolyte battery was manufactured as in Example 6, except that the nonaqueous electrolyte was filled into the case by controlling the molar amount of the lithium ions relative to 1.0 mAh of the battery capacity at $1.2 \times 10^{-5}$ mol.

COMPARATIVE EXAMPLE 8

A nonaqueous electrolyte battery was manufactured as in Example 17, except that the nonaqueous electrolyte was filled into the case by controlling the molar amount of the lithium ions relative to 1.0 mAh of the battery capacity at $1.2 \times 10^{-5}$ mol.

The initial charging was applied to each of the nonaqueous electrolyte batteries thus manufactured, followed by discharging the nonaqueous electrolyte battery at a constant current of 45 mA in an environment of 25° C. so as to measure the discharge capacity. Then, the nonaqueous electrolyte battery was charged again, followed by discharging the nonaqueous electrolyte battery at a constant current of 450 mA in an environment of 25° C. so as to measure the discharge capacity. Incidentally, the discharge capacity (mAh) was calculated by multiplying the discharge current value (mA) by the discharge time (h).

The charge-discharge conditions were as follows in respect of the nonaqueous electrolyte battery for each of Examples 1 to 13, Example 16, Comparative Examples 1 to 3 and Comparative Examples 6 to 7, in which the negative electrode active material was formed of lithium-titanium oxide. To be more specific, the secondary battery was charged at a constant current of 45 mA until the battery voltage was reached to 2.8 V and, then, the secondary battery was further charged at a constant voltage of 2.8 V until the total charging time reached 10 hours. Then, the secondary battery was discharged until the battery voltage was reached to 1.5 V. The charge-discharge conditions in the case of discharging the secondary battery at 450 mA were equal to that at 45 mA.

The charge-discharge conditions were as follows in respect of Examples 14, 15, 17 and Comparative Examples 4, 5, and 8, in which the negative electrode active material was formed of a mesophase carbon pitch fiber. To be more specific, the secondary battery was charged at a constant current of 45 mA until the battery voltage was reached to 4.2 V and, then, the secondary battery was further charged at a constant voltage of 4.2 V until the total charging time reached 10 hours. Then, the secondary battery was discharged until the battery voltage was reached to 3 V. The charge-discharge conditions in the case of discharging the secondary battery at 450 mA were equal to that at 45 mA.

The volume energy density of the nonaqueous electrolyte battery was calculated. In the first step, the length, width and thickness of the nonaqueous electrolyte battery were measured by using a vernier caliper so as to calculate the volume of the nonaqueous electrolyte battery. Then, the rated capacity of the nonaqueous electrolyte battery was divided by the volume thus calculated so as to calculate the volume energy density.

Table 1 shows the result. Incidentally, the nonaqueous electrolyte battery for Example 13 was short-circuited after the secondary battery was repeatedly subjected to the charging and discharging several times.

TABLE 1

| | Ionic liquid | Lithium salt | Li+ molar amount 10E−5 mol | Li+ mol concentration M | Electrical conductivity mS/cm | Separator porosity % | Discharge capacity for 45 mA discharge mAh | Discharge capacity for 450 mA discharge mAh | Volume energy density mAh/cm³ |
|---|---|---|---|---|---|---|---|---|---|
| Example 1 | EMI•BF₄ | LiBF₄ | 3.5 | 1.0 | 0.86 | 90 | 448 | 405 | 71 |
| Example 2 | EMI•BF₄ | LiBF₄ | 3.5 | 2.0 | 0.54 | 90 | 452 | 421 | 69 |
| Example 3 | EMI•BF₄ | LiBF₄ | 3.5 | 2.5 | 0.41 | 90 | 451 | 422 | 67 |
| Example 4 | EMI•BF₄ | LiBF₄ | 3.5 | 3.0 | 0.32 | 90 | 452 | 418 | 64 |
| Example 5 | EMI•BF₄ | LiBF₄ | 3.5 | 0.5 | 1.12 | 90 | 450 | 291 | 73 |
| Example 6 | EMI•BF₄ | LiBF₄ | 3.5 | 3.2 | 0.28 | 90 | 449 | 221 | 62 |
| Example 7 | EMI•TFSI | LiTFSI | 3.5 | 1.5 | 0.27 | 90 | 446 | 348 | 68 |
| Example 8 | EMI•BF₄ | LiBF₄ | 1.8 | 2.0 | 0.54 | 90 | 450 | 410 | 74 |
| Example 9 | EMI•BF₄ | LiBF₄ | 4.5 | 2.0 | 0.54 | 90 | 449 | 415 | 64 |
| Example 10 | EMI•BF₄ | LiBF₄ | 3.5 | 2.0 | 0.54 | 30 | 451 | 352 | 59 |
| Example 11 | EMI•BF₄ | LiBF₄ | 3.5 | 2.0 | 0.54 | 50 | 452 | 399 | 65 |
| Example 12 | EMI•BF₄ | LiBF₄ | 3.5 | 2.0 | 0.54 | 98 | 451 | 425 | 72 |
| Example 13 | EMI•BF₄ | LiBF₄ | 3.5 | 2.0 | 0.54 | 99 | 450 | 428 | 72 |
| Example 14 | 13PP•TFSI | LiTFSI | 3.5 | 1.5 | 0.15 | 90 | 440 | 329 | 66 |
| Example 15 | 1124N•TFSI | LiTFSI | 3.5 | 1.5 | 0.11 | 90 | 438 | 322 | 67 |
| Example 16 | EMI•BETI | LiBETI | 3.5 | 0.6 | 0.15 | 90 | 443 | 320 | 67 |
| Example 17 | 13P•TFSI | LiTFSI | 3.5 | 1.5 | 0.16 | 90 | 443 | 333 | 66 |
| Comparative Example 1 | EMI•BF₄ | LiBF₄ | 1.2 | 2.0 | 0.54 | 90 | 452 | 270 | 78 |
| Comparative Example 2 | EMI•BF₄ | LiBF₄ | 1.2 | 2.5 | 0.41 | 90 | 451 | 260 | 73 |
| Comparative Example 3 | EMI•TFSI | LiTFSI | 1.2 | 1.5 | 0.27 | 90 | 445 | 243 | 75 |
| Comparative Example 4 | 13PP•TFSI | LiTFSI | 1.2 | 1.5 | 0.15 | 90 | 431 | 181 | 72 |
| Comparative Example 5 | 1124N•TFSI | LiTFSI | 1.2 | 1.5 | 0.11 | 90 | 428 | 152 | 71 |
| Comparative Example 6 | EMI•BETI | LiBETI | 1.2 | 0.6 | 0.15 | 90 | 443 | 177 | 69 |
| Comparative Example 7 | EMI•BF₄ | LiBF₄ | 1.2 | 3.2 | 0.28 | 90 | 448 | 198 | 75 |
| Comparative Example 8 | 13P•TFSI | LiTFSI | 1.2 | 1.5 | 0.16 | 90 | 445 | 189 | 72 |

As shown in Table 1, the discharge capacity during the discharge at 450 mAh for the secondary battery for each of Examples 1 to 17 was found to be larger than that for the secondary battery for Comparative Examples 1 to 8. It follows that the secondary battery is excellent in large current characteristics if the molar amount of the lithium ions is no smaller than $1.8 \times 10^{-5}$ mol per mAh of the battery capacity.

Also, the discharge capacity during the discharge at 450 mAh for the secondary battery for each of Examples 1 to 4 was found to be larger than that for the secondary battery for Examples 5 and 6. It follows that the secondary battery is more excellent in large current characteristics if the lithium ion concentration of the nonaqueous electrolyte falls within no lower than 1.0 mol/L to no higher than 3.0 mol/L. Further, the discharge capacity of the secondary battery during the discharge at 450 mAh for each of Examples 2 to 4 is larger than that for Example 1. It follows that the large current characteristics can be further improved if the lithium ion concentration in the nonaqueous electrolyte falls within no lower than 1.5 mol/L to no higher than 3.0 mol/L.

Also, the discharge capacity of the secondary battery during the discharge at 450 mAh for Example 2 was found to be larger than that for each of Examples 8 and 9. It follows that the large current characteristics of the secondary battery can be further improved if the molar amount of the lithium ions falls within no smaller than $2.0 \times 10^{-5}$ mol to no larger than $3.5 \times 10^{-5}$ mol per mAh of the battery capacity.

Also, the amount of increase in the discharge capacity of the secondary battery for each of Examples 2, 3 and 7, which is derived from the situation that the electrical conductivity of the nonaqueous electrolyte is no lower than 0.41 mS/cm at 25° C., is larger than that for each of Comparative Examples 1 to 3. It follows that the large current characteristics of the secondary battery are excellent if the electrical conductivity of the nonaqueous electrolyte is no lower than 0.41 mS/cm at 25° C.

Further, the nonaqueous electrolyte battery for each of Examples 2 and 11 has a volume energy density higher than that of the nonaqueous electrolyte battery for Example 10. It follows that the volume energy density is improved if the porosity of the separator is no lower than 50%.

Further, the possibility of the short-circuiting of the secondary battery for Example 12 is lower than that of the secondary battery for Example 13. It follows that, if the porosity of the separator is no higher than 98%, the secondary battery is excellent in safety.

As apparent from Examples 1 to 6, the volume energy density is increased with decrease in the lithium ion concentration in the nonaqueous electrolyte. It is considered reasonable to understand that, with decrease of the lithium ion concentration, the viscosity of the nonaqueous electrolyte is lowered so that it is possible to permit the electrode to be impregnated smoothly with the nonaqueous electrolyte and, thus, to increase the volume energy density.

The measuring methods of the electrical conductivity of the nonaqueous electrolyte, the lithium ion concentration, the volume of the nonaqueous electrolyte, and the porosity of the separator, and the measuring method of the particle diameter d50 of the lithium titanate will now be described.

<Measuring Method of Electrical Conductivity of Nonaqueous Electrolyte>

The electrical conductivity κ [S/cm] is represented by the reciprocal of the specific resistance ρ as given below:

$$\kappa = 1/\rho = l/(RbA) \quad (1)$$

where Rb[Ω] denotes the resistance, A[cm$^2$] denotes the cross sectional area of the electrode, and l[cm] denotes the distance between the electrodes. In general, it is difficult to obtain accurate values of the area A and the distance l.

Figure 3:
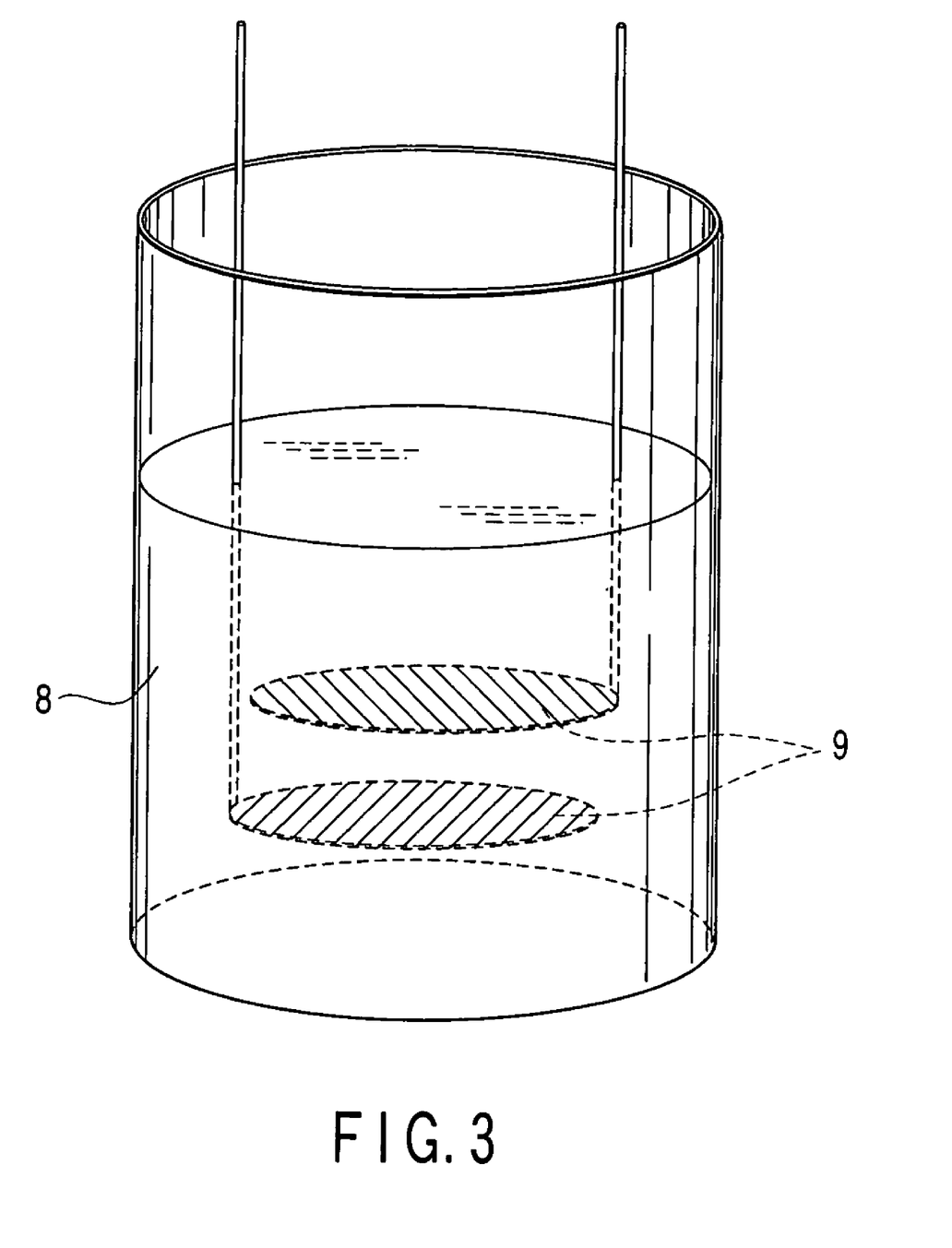
FIG. 3 is an oblique view schematically showing the construction of a measuring cell used for measuring the electrical conductivity.

Therefore, in this example, the cell constant (=l/A) of the measuring cell was obtained by using potassium chloride as the standard solvent. FIG. 3 is an oblique view schematically showing the construction of the measuring cell. As shown in FIG. 3, a liquid electrolyte 8 is filled into the measuring cell. Two Pt electrodes 9 arranged in parallel are dipped in the liquid electrolyte 8. Then, the electrical conductivity of the liquid electrolyte was measured at 25° C. by the alternating current (AC) impedance method by using a 1287 type potentio/galvanostat and a 1260 type frequency response analyzer (FRA) manufactured by Sorlatron Ltd. of the United Kingdom. For this measurement, the frequency was set at 1,000 Hz.

<Measuring Method of Lithium Ion Concentration in Nonaqueous Electrolyte>

In this example, the lithium ion concentration in the non-aqueous electrolyte can be measured by using, for example, atomic absorption spectroscopy photometer and an inductively coupled plasma (ICP) high-frequency dielectric plasma analytical apparatus.

<Measuring Method of Volume of Nonaqueous Electrolyte>

In the first step, a specified amount of the nonaqueous electrolyte is extracted from within the battery so as to measure the specific gravity of the nonaqueous electrolyte. In the case of the nonaqueous electrolyte battery of a size substantially equal to that of the nonaqueous electrolyte battery shown in FIG. 1, 1 mL of the nonaqueous electrolyte is extracted from within the battery. Then, the battery is dismantled, followed by washing the parts of the battery with methyl ethyl carbonate or a dimethoxy ethane solution so as to remove the nonaqueous electrolyte and the lithium salt attached to the parts of the battery. Further, each part of the battery is dried under a reduced pressure, followed by weighing the part of the battery. Finally, the volume of the nonaqueous electrolyte is determined on the basis of the difference in weight of the parts of the battery between the parts before the dismantling and the parts after the dismantling of the battery, the amount of the nonaqueous electrolyte extracted for determination of the specific gravity, and the specific gravity obtained in advance.

<Measuring Method of the Porosity of the Separator>

The porosity of the separator can be calculated by formula (2) given below:

$$\text{porosity } [\%] = 100 - \{(w/\rho/t/S) \times 100\} \quad (2)$$

where t denotes the thickness [cm] of the separator, S denotes the surface area [cm$^2$] of the separator, ρ denotes the absolute specific gravity [g/cm$^3$] of the material, and w denotes the weight [g] of the separator.

In this example, each parameter was measured as follows so as to calculate the porosity of the separator. Specifically, the separator was punched into a piece sized at 1 cm×1 cm (having a surface area of 1 cm$^2$) and the thickness of the punched piece was measured by using a vernier caliper. Since the absolute specific gravity of the material is determined by the kind of the material, the absolute specific gravity was taken from reference literature such as "Kagaku Binran" or "Rikagaku Jiten" (Scientific Dictionary). Further, the weight of the separator was measured by using an electronic balance.

<Measuring Method of Particle Diameter d50 of Lithium Titanate>

The lithium titanate powder was dispersed first in water, followed by allowing a laserbeam (red semiconductor laserbeam having a wavelength of 680 nm) to be transmitted through the dispersion so as to obtain the transmittance distribution. The particle size distribution of the lithium titanate powder (i.e., distribution of the particle size of the powdery particles of the lithium titanate) was measured on the basis of the transmittance distribution of the laserbeam. The average particle diameter at 50% of the accumulation of the particle size distribution was used as the particle diameter d50.

The particle diameter of the lithium titanate particles contained in the electrode was confirmed as follows.

In the first step, a scanning electron microscope (SEM) image of the electrode surface was photographed by using a SEM. Then, the lithium titanate particles in the SEM image were determined by taking the element distribution on the surface of the electrode by using an energy-dispersive x-ray (EDX) analyzer. To be more specific, 50 lithium titanate particles in the SEM image were extracted at random, and the average value of the particle diameters of these particles was used as the average particle diameter of the lithium titanate particles.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery, comprising:
 a case;
 a positive electrode housed in the case;
 a negative electrode housed in the case; and
 a nonaqueous electrolyte containing an ionic liquid and no lower than 1 mol/L to no higher than 3 mol/L of lithium ions, wherein the lithium ions are present in a molar amount which is no smaller than 2×10$^{-5}$ mol to no larger than 3.5×10$^{-5}$ mol per mAh of the battery capacity, wherein
 the ionic liquid contains anion and cation, and the cation is at least one selected from the group consisting of imidazolium ion, alkyl pyridinium ion, and dialkyl piperidinium ion, and wherein the nonaqueous electrolyte consists of the ionic liquid and lithium salts.

2. The nonaqueous electrolyte battery according to claim 1, wherein the negative electrode and the positive electrode are positioned spatially apart from each other.

3. The nonaqueous electrolyte battery according to claim 1, wherein the nonaqueous electrolyte contains no lower than 1.5 mol/L to no higher than 3 mol/L of the lithium ions.

4. The nonaqueous electrolyte battery according to claim 1, wherein the nonaqueous electrolyte has an electrical conductivity of no lower than 0.41 mS/cm at 25° C.

5. The nonaqueous electrolyte battery according to claim 1, wherein the nonaqueous electrolyte has an electrical conductivity falling within no lower than 0.41 mS/cm to no higher than 20 mS/cm at 25° C.

6. The nonaqueous electrolyte battery according to claim 1, wherein the nonaqueous electrolyte contains no lower than 1 mol/L of the lithium ions and has an electrical conductivity of no lower than 0.41 mS/cm at 25° C.

7. The nonaqueous electrolyte battery according to claim 1, wherein:
the nonaqueous electrolyte contains no lower than 1 mol/L to no higher than 3 mol/L of the lithium ions and has an electrical conductivity falling within no lower than 0.41 mS/cm to no higher than 20 mS/cm at 25° C.

8. The nonaqueous electrolyte battery according to claim 1, further comprising a separator interposed between the positive electrode and the negative electrode and having a porosity of no smaller than 50% to no larger than 98%.

9. The nonaqueous electrolyte battery according to claim 1, further comprising a separator interposed between the positive electrode and the negative electrode and having a porosity of no smaller than 80% to no larger than 97%.

10. The nonaqueous electrolyte battery according to claim 1, wherein at least one of the positive electrode and the negative electrode contains carbon black.

11. The nonaqueous electrolyte battery according to claim 1, wherein at least one of the positive electrode and the negative electrode contains an electronic conductor having a DBP Oil Absorption of no smaller than 200 mL/100 g to no larger than 2,000 mL/100 g.

12. The nonaqueous electrolyte battery according to claim 1, wherein the cation is at least one selected from the group consisting of 1-ethyl-3-methyl imidazolium ion, 1,2-dimethyl-3-propyl imidazolium ion, and methyl propyl piperidinium ion.

13. The nonaqueous electrolyte battery according to claim 1, wherein the ionic liquid contains at least one anion selected from the group consisting of $PF_6^-$, $PF_3(C_2F_5)_3^-$, $PF_3(CF_3)_3^-$, $BF_4^-$, $BF_2(CF_3)_2^-$, $BF_3(CF_3)^-$, $[B(COOCOO)_2^-]$, $CF_3SO_3^-$, $C_4F_9SO_3^-$, $[(CF_3SO_2)_2N]^-$, $[(C_2F_5SO_2)_2N]^-$, and $[(CN)_2N]^-$.

14. The nonaqueous electrolyte battery according to claim 1, wherein the cation is at least one selected from the group consisting of imidazolium ion, alkyl pyridinium ion, and dialkyl piperidinium ion and the ionic liquid contains at least one anion selected from the group consisting of tetrafluoro borate ion, bis trifluoromethane sulfonyl amide ion and bis pentafluoroethane sulfonyl amide ion.

15. The nonaqueous electrolyte battery according to claim 1, wherein the cation is at least one selected from the group consisting of 1-ethyl-3-methyl imidazolium ion, 1,2-dimethyl-3-propyl imidazolium ion, and methyl propyl piperidinium ion and the ionic liquid contains at least one anion selected from the group consisting of tetrafluoro borate ion, bis trifluoromethane sulfonyl amide ion and bis pentafluoroethane sulfonyl amide ion.

16. The nonaqueous electrolyte battery according to claim 1, wherein the negative electrode comprises at least one negative electrode active material selected from the group consisting of a lithium titanate and iron sulfide.

17. A nonaqueous electrolyte battery, comprising:
a case;
a positive electrode housed in the case;
a negative electrode housed in the case; and
a nonaqueous electrolyte containing an ionic liquid and no lower than 1 mol/L to no higher than 3 mol/L of lithium ions, wherein the lithium ions are present in a molar amount which is no smaller than $2 \times 10^{-5}$ mol to no larger than $3.5 \times 10^{-5}$ mol per mAh of the battery capacity, wherein
the nonaqueous electrolyte consists of the ionic liquid and lithium salts.

* * * * *